Aug. 21, 1962    R. E. HULTEN ETAL    3,049,938
STEERING WHEEL STOP MECHANISM
Filed Sept. 20, 1960    3 Sheets-Sheet 1

INVENTORS
Richard E. Hulten, &
BY  Carl J. Miller

Bruce Beecher
ATTORNEY

Aug. 21, 1962 R. E. HULTEN ETAL 3,049,938
STEERING WHEEL STOP MECHANISM
Filed Sept. 20, 1960 3 Sheets-Sheet 2
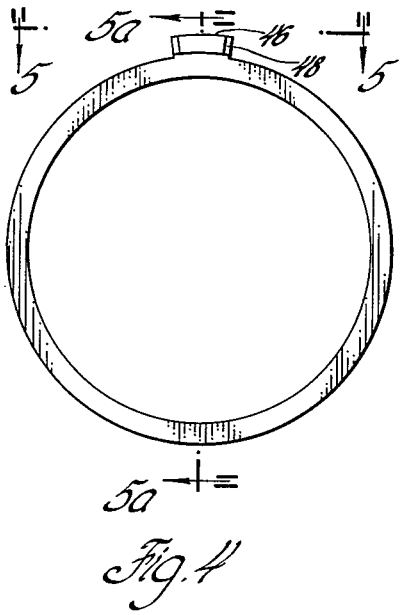
Fig. 4
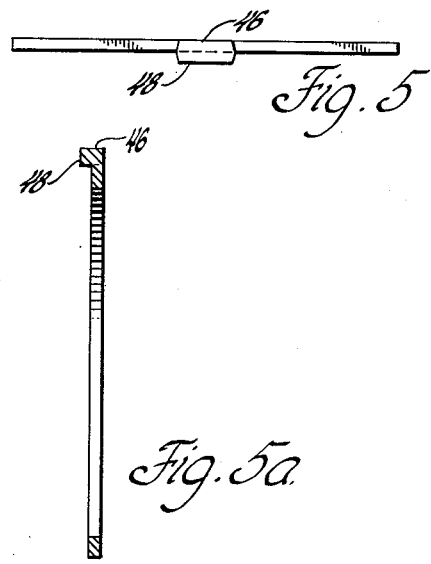
Fig. 5
Fig. 5a
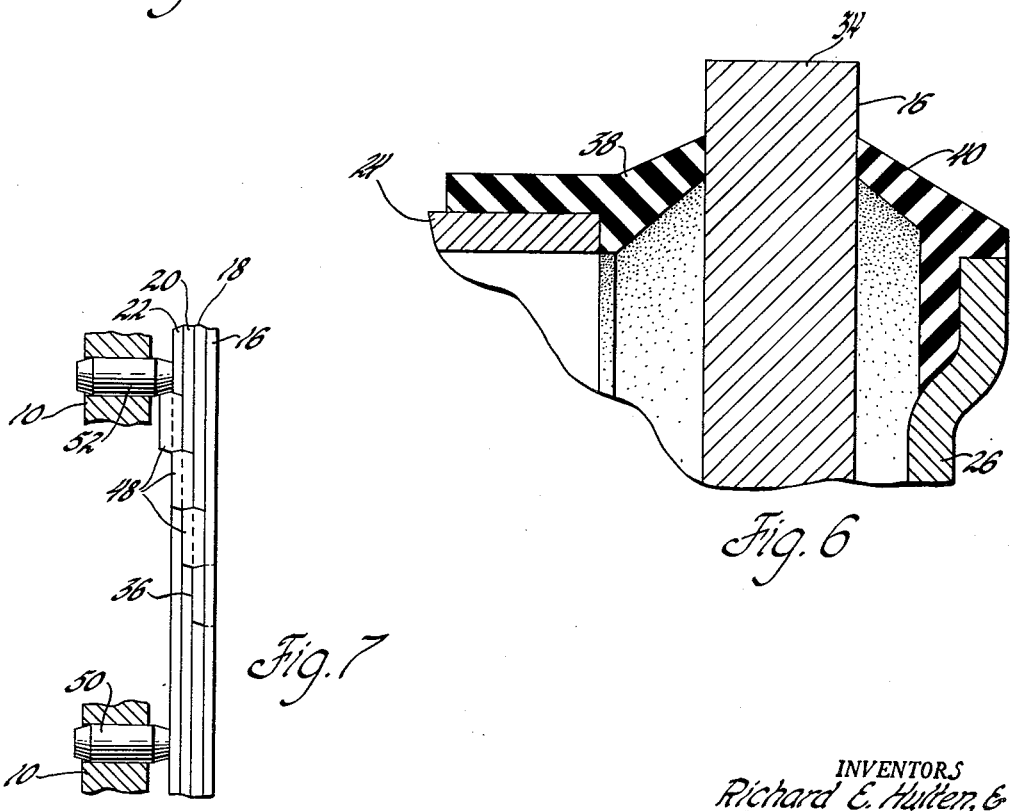
Fig. 6
Fig. 7
INVENTORS
Richard E. Hulten, &
BY Carl J. Miller
Bryce Beecher
ATTORNEY Aug. 21, 1962  R. E. HULTEN ETAL  3,049,938
STEERING WHEEL STOP MECHANISM Filed Sept. 20, 1960  3 Sheets-Sheet 3

INVENTORS
Richard E. Hulten, &
BY Carl J. Miller
Bryce Beecher
ATTORNEY

United States Patent Office 3,049,938
Patented Aug. 21, 1962

3,049,938
STEERING WHEEL STOP MECHANISM
Richard E. Hulten, Pontiac, and Carl J. Miller, Warren, Mich., assignors to General Motors Corporation, Detroit, Mich., a corporation of Delaware
Filed Sept. 20, 1960, Ser. No. 57,303
5 Claims. (Cl. 74—526)

This invention relates to a stop mechanism for limiting the steering movement of the dirigible means of a vehicle, particularly a self-propelled vehicle comprising manually actuated rotary means for effecting the steering action. In its most particular aspect the invention relates to such stop mechanism as applied to automotive vehicles incorporating dirigible wheels, together with a steering shaft.

Heretofore it has been customary to limit the turning movement of the dirigible wheels about the kingpin axis by stops located to engage the wheels themselves. This expedient has not proven altogether satisfactory because in some cases it has resulted in misalignment of the dirigible wheels. Also, there has been objection to the noise which occurs when the wheels make contact with the stops and to the squeaking and snapping caused by the loading-up of the steering linkage and the suspension parts.

Where the vehicle is power steered there is additional noise resulting from the opening of the relief valve incorporated in the power steering pump and from slipping of the belt through which the pump is powered. This slipping is caused by resistance of the pump rotor to turning on account of the high pressure it is working against when the dirigible wheels are in lock position.

As suggested, a principal object of the present invention is to provide a stop mechanism avoiding the undesiderata just discussed.

Another object is to provide a stop mechanism which is easily and inexpensively modified to perform its function should it become necessary or desirable to change the steering ratio.

Still other objects and features of the invention will be apparent from the following description which will proceed with reference to the accompanying drawings showing a preferred embodiment of the invention. In the drawings:

FIGS. 3–5a are details of annular tanged elements utilized in the practice of the invention;

FIG. 6 is a fragmentary section supplied to illustrate the operation of sealing means employed in the stop assembly;

FIG. 7 is a diagrammatic representation of the parts making up the stop assembly, the same being shown in lock position;

Figure 1:
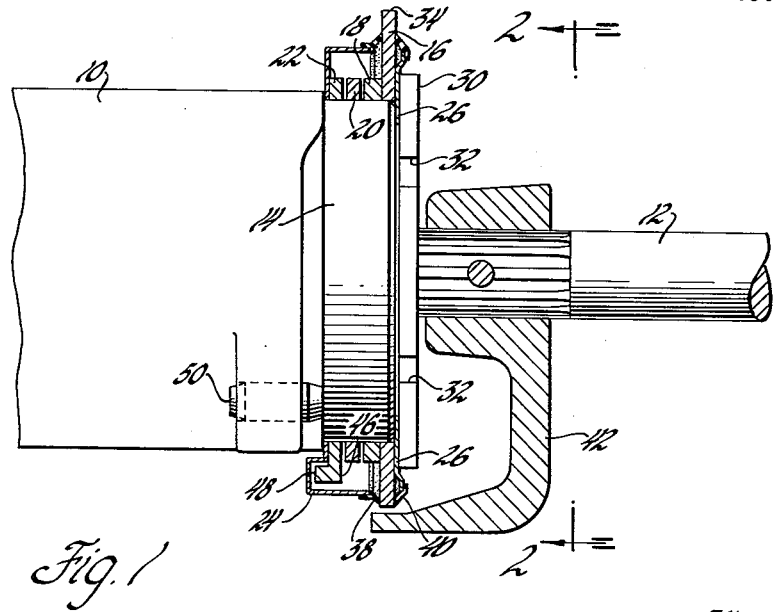
FIG. 1 illustrates the invention as applied in a steering system comprising an ordinary gear box, the view being in side elevation with certain parts shown broken away or in section.
Figure 2:
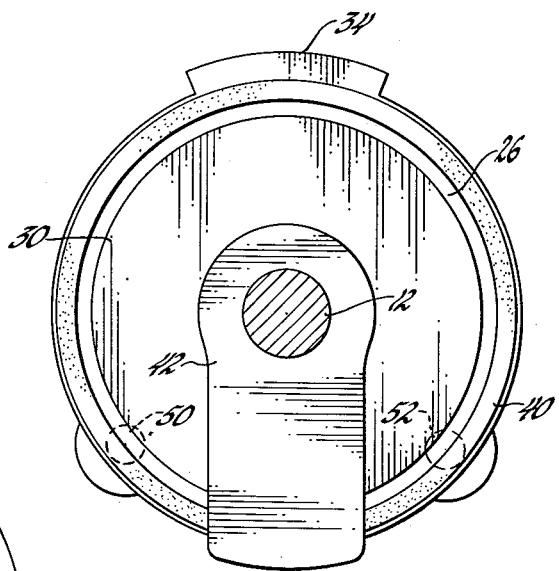
FIG. 2 is a view on the line 2—2 in FIG. 1.

Referring first to FIG. 1, the numeral 10 denotes a gear box which, as installed in the vehicle, is fixedly connected to a frame member, not shown. Within such a box, as well understood, is normally housed a steering worm or cam having operable connection with a cross shaft mounting a pitman arm externally of the box, such arm being directly connected to the steering linkage. These parts all being conventional, none requires of illustration. A steering shaft 12 seen extending into the gear box 10 is integral with or fixedly connected to the worm or cam and is manually rotated to induce the steering action.

The box or casing 10 is shown formed with a cylindrical boss 14 rotatably supporting a series of ring elements or flat-sided washers 16, 18, 20 and 22. A housing 24 for these ring elements is secured by an annular retainer 26, held in place by a flanged member 30 threaded into the boss support 14. Member 30 is provided with holes 32 in the interest of the tool employed to locate it.

Figure 3:
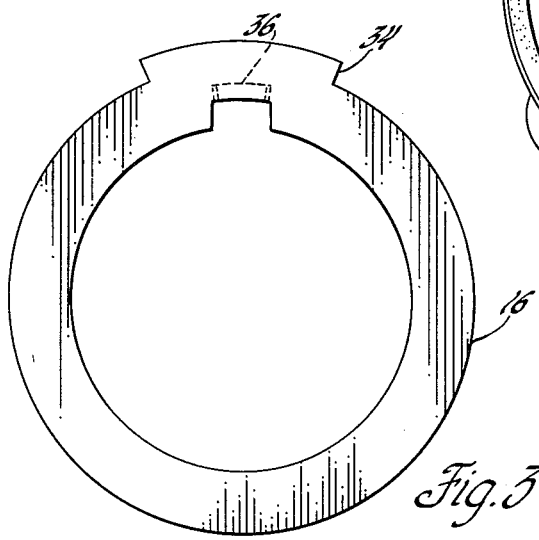

As clearly appears from FIGURE 1, the peripheral portion of the ring element 16, which carries a radial tang 34 (FIG. 3) and an axially extending tang 36, lies outwardly of the housing 24. To prevent escape of the lubricant normally used in the stop assembly, the housing 24 and the retainer 26 are equipped with complementary annular lip seals 38 and 40 (FIG. 6) which engage the opposed side walls of the ring element 16.

For coaction with the ring element 16, steering member 12 has keyed or otherwise secured thereto for rotation therewith a stop member 42 the end of which is adapted to engage with the radial tang 34 on rotation of the steering shaft.

Ring elements 18, 20 and 22 are formed as illustrated by FIGS. 4, 5 and 5a. Thus each of these elements carries a tang comprising a portion 46 extending radially of the body of the ring element and a portion 48 disposed in a plane normal to that of the portion 46.

It is important to make note of the fact that in the stop assembly all of the tang portions 48 and the tang 36 of the ring element 16 extend in the direction toward the gear box 10.

Gear box 10 has fixed therein a pair of stops 50 and 52 located on the arc of a sector corresponding to the path of movement of the tang portion 48 of the ring element 22. These stops 50 and 52, as readily apparent, have the form of dowel pins.

In operation of the mechanism, as shaft 12 is rotated, stop means 42 engages tang 34 of ring element 16 to cause rotation of such ring element. On the continued rotation of shaft 12 tang 36 of the ring element 16 engages the tang portion 48 of the ring element 18 and so on until the tang portion 48 of the ring element 22 contacts the stop 50 or 52, depending on the direction of rotation of the shaft 12. With this occurrence, the condition of the parts is as diagrammatically represented by FIG. 7 and further rotation of the steering shaft 12 is not possible.

It should be clear that the number of rotations of the shaft 12 possible before the stop or lock position is reached is a function of the distance between the stops 50 and 52, the number of ring elements and the width of the tangs. The particular assembly illustrated is designed to allow for substantially two complete turns of the shaft 12 from center to the lock position. In the specific vehicle, the pitman arm travel from lock to lock is 79°. At assembly, the ring element 16, with the steering gear on center, is first wound either clockwise or counterclockwise to the corresponding stop position.

Thereafter, before location of the threaded plug 30, such ring element is backed off 1.5 turns to the illustrated position whereat the tang 34 is 180° from the stop 42 carried by the shaft 12.

Figure 8:
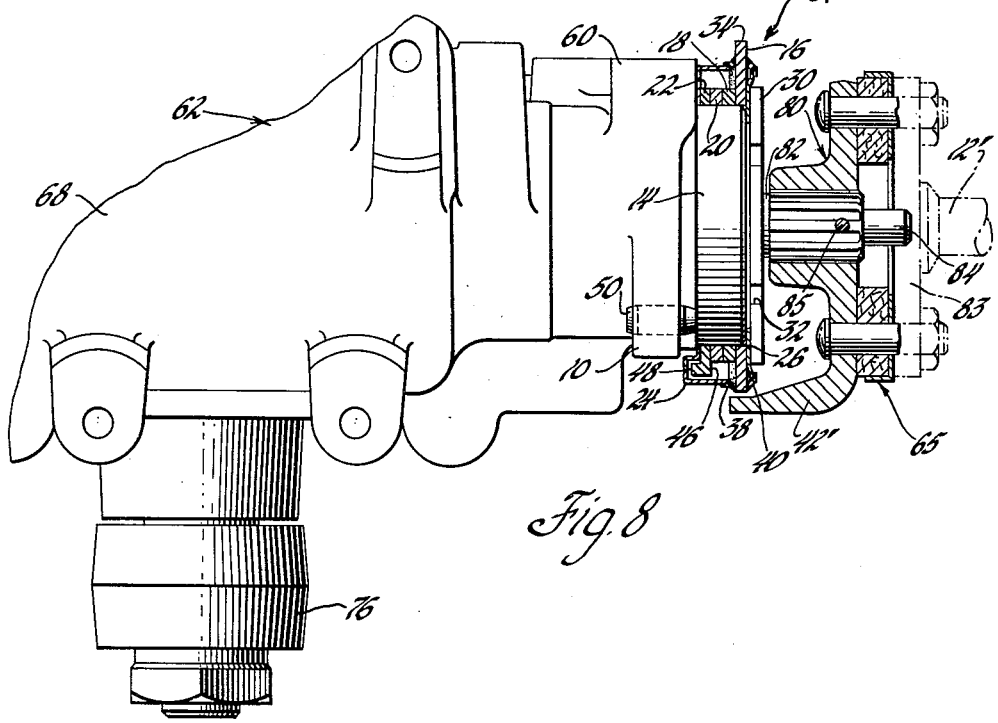
FIG. 8 illustrates the stop mechanism as applied to an integral power steering unit, shown broken away.

In FIG. 8 the stop assembly, generally denoted by the numeral 61, is shown as applied to an integral power steering gear of a now conventional type. This gear is described and illustrated in the copending application of William B. Thompson and Philip B. Zeigler, filed September 19, 1958 and assigned Serial No. 762,153. Suffice it to say here that the right hand portions 60 of the cylinder 62 is formed to accommodate a rotary valve mechanism made up of an outer sleeve member 64 (FIG. 9) and an inner sleeve member 66. This valve mechanism is actuated by the steering shaft 12' through a flexible coupling 65.

Figure 9:
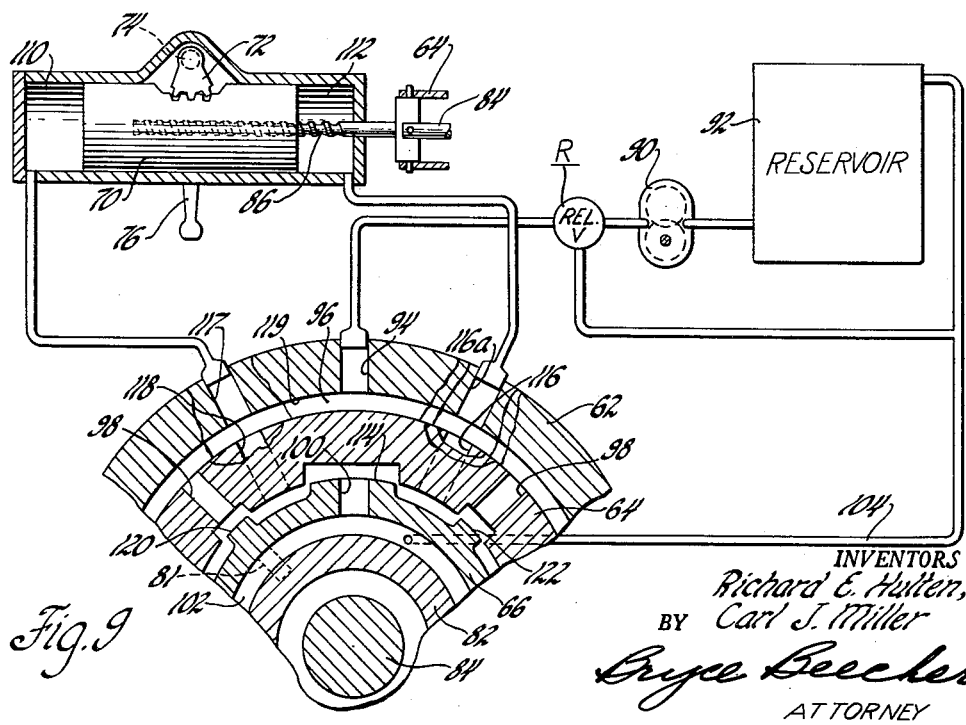
FIG. 9 is a generally diagrammatic representation of a power steering system utilizing the unit shown by FIG. 8.

Within the enlarged portion 68 of the cylinder 60 is a power piston identified by the numeral 70 in FIG. 9. Such piston carries rack teeth meshing with the teeth of a gear sector 72 integral with the cross shaft 74 which extends externally of the cylinder 60 for connection to pitman arm 76.

In the case of the gear of FIG. 8, the stop 42' is integral with the left hand component 80 of the flexible coupling 65. Such component is splined or keyed to a stub shaft 82 which has a pin connection 81 (FIG. 9) with the inner sleeve member 66 of the rotary valve mechanism. A detailed description of the flexible coupling, which includes a component 83 keyed or otherwise suitably secured to the shaft 12' to rotate therewith, will be found provided by U.S. Patent 2,753,848 granted July 10, 1956 to Robert W. Burton.

As shown in FIG. 8, stub shaft 82, constituting the input to the power steering gear, has pinned (85) thereto a torsion bar 84. Such bar at it other end (FIG. 9) has connection with the load through a worm 86 accommodated in a threaded bore in the piston 70. The outer sleeve member 64 of the valve mechanism will also be seen connected to the load through the worm 86.

The pressure fluid required for the operation of the steering gear is furnished by a pump 90 drawing from a reservoir 92. This pump has a relief valve R associated therewith and discharges through a port 94 in the cylinder 62. Such port will be noted as opening to an annular pressure passage 96. With the valve members in their centered position, corresponding to the normal straight-ahead position of the dirigible wheels of the vehicle, the fluid supplied by the pump flows from the annular passage 96 through ports 98 in the outer sleeve member 64 to an exhaust port 100 formed in the inner sleeve member 66. The latter port opens to a chamber 102 having communication with the return line 104 to the reservoir 92.

In the steering of the vehicle, the rotative displacement of the sleeve member 66 operates to prevent fluid flow from one of the chambers 110, 112 of the power cylinder to the return line 104. Thus, a pressure is caused to develop in such chamber and the desired power assist provided. The rotative displacement of the sleeve member 66 occurs against the resistance of the torsion bar 84 which tends to maintain the valve parts in centered relation. In view of the connection between the outer sleeve member 64 and the worm 86, the steering action is accompanied by rotation of such sleeve member which thus seeks constantly to catch-up, so to speak, with the sleeve member 66.

Assuming a right turn, for example, the clockwise rotation of sleeve member 66 brings land 114 to a position whereat fluid flow as between the power cylinder and the exhaust port 100 can occur only from the chamber 110. The flow follows the route of ports 117, 118 and an annular chamber 119. With the valve member 66 displaced to the right, chamber 110 is cut off from communication with the pump by the land 120.

In the case of a left turn, the conditions are just the reverse of the above, that is, land 114 prevents flow from port 118 to port 100 while allowing flow from the left hand pressure port 98 to port 118. Also in the case of a left turn, land 122 prevents the flow of pressure fluid from the right hand pressure port 98 through ports 116, 116a to chamber 112.

It is to be understood that the foregoing description is provided in the interest of making the invention herein clear in its relation to a power steered vehicle. Heretofore, as brought out in the introductory portion of this specification, arrival of the dirigible wheels at their stops, as frequently occurs in parking operations, has been marked by opening of the relief valve R giving rise to an undesirable squeal which has proven annoying if not alarming to many operators. This opening of the relief valve occurred because of the pressure build-up in the system resulting from the fact that outer sleeve component 64 of the valve because of its being connected to the load could not follow up the rotatively displaced inner inner sleeve member 66 to connect both chambers of the power cylinder to exhaust.

When the vehicle is equipped with the stop mechanism of the present invention in lieu of the stops at the dirigible wheels, allowance is made so that when the rotative movement of the steering shaft is arrested by the stop mechanism the outer sleeve component 64 is able to center itself with reference to the inner sleeve member 66. Accordingly, there can be no pressure build-up in the system of a magnitude causing opening of the relief valve.

We claim:

1. A vehicle including a rotary steering input member and dirgible means, a stop mechanism for said rotary member comprising first stop means adapted to rotate with said member, fixed stop means axially spaced from said first stop means, a fixed support mediate said first stop means and said fixed stop means, and one or more ring elements encircling said support in axial alignment and rotatable thereon, each such ring element being provided with tang means coacting with said first stop means and said fixed stop means to limit the number of turns of said rotary input member possible in either direction of rotation of said member.

2. In a vehicle including a rotary steering shaft and a pair of dirigible wheels, a stop mechanism for said steering shaft comprising first stop means adapted to rotate therewith, fixed stop means axially spaced from said first stop means, a fixed cylindrical support mediate said first stop means and said fixed stop means, and a plurality of ring elements encircling said support in axial alignment and rotatable thereon, each of said ring elements being provided with tang means coacting with said first stop means and said fixed stop means to limit the number of turns of said steering shaft possible in either direction of rotation thereof.

3. In a vehicle including a steering shaft and a pair of dirigible wheels, a stop mechanism for said steering shaft comprising first stop means adapted to rotate therewith, a pair of fixed stops axially spaced from said first stop means and spaced from each other on the arc of a sector, a fixed cylindrical support mediate said first stop means and said pair of fixed stops, and a plurality of ring elements encircling said support in axial alignment and rotatable thereon, each of said ring elements being provided with tang means coacting with said first stop means and said fixed stops to limit the number of turns of said steering shaft possible in either direction of rotation thereof.

4. In association with a vehicle steering system including a power steering unit, a rotary member inputing to said unit and a rotatable steering shaft connected to said rotary input member through a coupling comprising a first component connected to said rotary input member and a second component connected to said steering shaft, a stop mechanism for said shaft including first stop means carried by said first component, a pair of fixed stops on said unit spaced from each other on the arc of a sector, a cylindrical support on said unit mediate said first stop means and said pair of fixed stops, and a plurality of flat-sided washers encircling said support in axial alignment and rotatable thereon, each of said washers being provided with tang means coacting with said first stop means and said pair of fixed stops to limit the numbers of turns of said steering shaft possible in either direction of rotation thereof, the washer adjacent said first component being of greater diameter than the other washers and having a peripheral radially extending tang adapted to be engaged by said first stop means.

5. A stop mechanism as defined by claim 4 further including a housing for said washers secured to said unit by means of a retainer, said retainer and the adjacent end of said housing being provided with sealing means engaging the opposed sides of the said washer adjacent said first component.

References Cited in the file of this patent
UNITED STATES PATENTS

| | | |
|---|---|---|
| 2,836,991 | Perlis | June 3, 1958 |
| 2,911,850 | Schmidt | Nov. 10, 1959 |

UNITED STATES PATENT OFFICE
CERTIFICATE OF CORRECTION

Patent No. 3,049,938                      August 21, 1962

Richard E. Hulten et al.

It is hereby certified that error appears in the above numbered patent requiring correction and that the said Letters Patent should read as corrected below.

Column 3, line 35, for "it" read -- its --; line 71, for "The" read -- This --; column 4, line 20, strike out "inner", first occurrence; line 31, for "A vehicle" read -- In a vehicle --; column 5, line 7, for "numbers" read -- number --.

Signed and sealed this 8th day of January 1963.

(SEAL)
Attest:

ERNEST W. SWIDER
Attesting Officer

DAVID L. LADD
Commissioner of Patents